US011900176B2

(12) United States Patent
Eatough

(10) Patent No.: US 11,900,176 B2
(45) Date of Patent: Feb. 13, 2024

(54) INTEROPERABILITY BRIDGE FOR APPLICATION HOSTS

(71) Applicant: Microsoft Technology Licensing, LLC, Redmond, WA (US)

(72) Inventor: David Arthur Eatough, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/342,317

(22) Filed: Jun. 8, 2021

(65) Prior Publication Data

US 2022/0391266 A1  Dec. 8, 2022

(51) Int. Cl.
*G06F 9/54*  (2006.01)

(52) U.S. Cl.
CPC .............. *G06F 9/541* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 7,627,852 B1 * | 12/2009 | Stroomer | G06F 9/547 717/106 |
| 8,650,320 B1 | 2/2014 | Merrick et al. | |
| 2003/0182457 A1 * | 9/2003 | Brewin | G06F 8/51 712/E9.082 |
| 2009/0204953 A1 * | 8/2009 | Swingler | G06F 8/51 717/136 |
| 2010/0122271 A1 * | 5/2010 | Labour | G06F 16/95 719/328 |
| 2011/0093864 A1 | 4/2011 | Musum et al. | |
| 2015/0121348 A1 * | 4/2015 | Park | G06F 8/75 717/131 |
| 2015/0339352 A1 * | 11/2015 | Bice | G06F 16/24522 707/722 |

(Continued)

OTHER PUBLICATIONS

Ebner, et al., "Fast Native Function Calls for the Babel Language Interoperability Framework", In Proceedings of 11th IEEE/ACM International Conference on Grid Computing, Oct. 25, 2010, pp. 329-338.

(Continued)

*Primary Examiner* — Charles E Anya

(57) ABSTRACT

A method for function call invocation is described. A function call that is implemented in a first programming language and corresponds to a function implemented in a second programming language is received by an application bridge interface implemented in the first programming language. The first programming language is different from the second programming language. A common data structure is generated by a bridge module based at least in part on the function call received by the application bridge interface. The common data structure is sent by the bridge module to a native bridge interface implemented in the second programming language. The common data structure is converted by the native bridge interface to a native data structure implemented in the second programming language. The function is called by the native bridge interface using the native data structure implemented in the second programming language.

20 Claims, 9 Drawing Sheets

(56) References Cited

U.S. PATENT DOCUMENTS

| | | | | |
|---|---|---|---|---|
| 2016/0164953 | A1* | 6/2016 | Hristov | G06F 16/18 709/203 |
| 2017/0300501 | A1* | 10/2017 | Duminy | G06F 16/258 |
| 2019/0227794 | A1* | 7/2019 | Mercille | G06F 8/36 |
| 2020/0097342 | A1* | 3/2020 | Chandrasekaran | G06F 9/547 |
| 2020/0183671 | A1* | 6/2020 | Gururaj | G06F 8/51 |

OTHER PUBLICATIONS

"International Search Report & Written Opinion issued in PCT Application No. PCT/US22/028250", dated Aug. 18, 2022, 11 Pages.

* cited by examiner

INTEROPERABILITY BRIDGE FOR APPLICATION HOSTS

BACKGROUND

As software environments provided on computers and other processing devices have evolved using different programming languages across multiple layers, it may be beneficial for a first application in a first programming language to utilize functionality that has been implemented using a second programming language. In some scenarios, an application may use or re-use existing libraries of code providing features that have already been written and tested, or features that are uniquely available through a particular host environment. However, when the application and host environment are not directly compatible, the application may need to be written with customized code that is particular to the host environment. The use of customized code creates challenges when, for example, changing between host environments, where the customized code developed for a first host environment is no longer compatible with a second host environment.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to improving image quality of a stream of input images.

In accordance with some aspects of the present disclosure, a method for function call invocation is described. A function call that is implemented in a first programming language and corresponds to a function implemented in a second programming language is received by an application bridge interface implemented in the first programming language. The first programming language is different from the second programming language. A common data structure is generated by a bridge module based at least in part on the function call received by the application bridge interface. The common data structure is sent by the bridge module to a native bridge interface implemented in the second programming language. The common data structure is converted by the native bridge interface to a native data structure implemented in the second programming language. The function is called by the native bridge interface using the native data structure implemented in the second programming language.

In accordance with some aspects of the present disclosure, a system for function call invocation is described. The system comprises a processor, and a memory storing computer-executable instructions that when executed by the processor cause the system to: receive, by an application bridge interface implemented in a first programming language, a function call that is implemented in the first programming language, and corresponds to a function implemented in a second programming language, wherein the first programming language is different from the second programming language; generate, by a bridge module, a common data structure based at least in part on the function call received by the application bridge interface; send, by the bridge module, the common data structure to a native bridge interface implemented in the second programming language; convert, by the native bridge interface, the common data structure to a native data structure implemented in the second programming language; and call, by the native bridge interface, the function using the native data structure implemented in the second programming language.

In accordance with some aspects of the present disclosure, a method for event processing is described. A schema is processed where the schema identifies an event within a native host and identifies an event handler function within a user application that is configured to handle the event within an application host for a first programming language. An application bridge interface is generated based on the schema, where the application bridge interface is implemented in a first programming language, executed within the application host, and communicates between the user application and a bridge module. A native bridge interface is generated based on the schema, where the native bridge interface is implemented in a second programming language, executed within the native host, communicates between the bridge module and the native host, and includes an event receiver function for the event. The first programming language is different from the second programming language. A call to the event receiver function is received by the native bridge interface from the native host. A common data structure that corresponds to the event is generated by the event receiver function of the native bridge interface based at least in part on the call to the event receiver function. The common data structure is converted by the application bridge interface to an application data structure implemented in the first programming language. The event handler function is called within the application host using the application data structure.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure.

Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a host bridge configured to provide interoperability between different hosts, such as an application host and a native host. The application host may utilize a first programming language, such as TypeScript, while the native host may utilize a second programming language, such as C++. The host bridge provides a communication channel between the application host and the native host for passing information, such as data structures representing arguments (e.g., parameters) for a function call or return values from the function call. The data structures may also represent event notifications to be passed between the application host and the native host. The host bridge is implemented at least in part by a bridge interface generator that generates respective bridge interfaces for the application host and the native host. An application bridge interface is implemented in the first programming language and a native bridge interface is implemented in the second programming language. This approach allows a user application written for the application host (e.g., implemented in the first programming language) to communicate with a "familiar" software module (i.e., the application bridge interface) when the user application utilizes native application code implemented in the second programming language, where "familiar" software modules may include those written in either the same programming language as the user application or in a programming language that is natively supported by the first programming language, which simplifies development of the user application. For example, a software developer of the user application does not need to be familiar with detailed implementations of the native host to access the native application code. Moreover, the native application code does not need to be written in a manner that explicitly provides access to the user application or other modules located outside of the native host. In other words, the native application code may be developed as a standalone application or library that may be utilized by other native applications executed within the native host.

Figure 1:
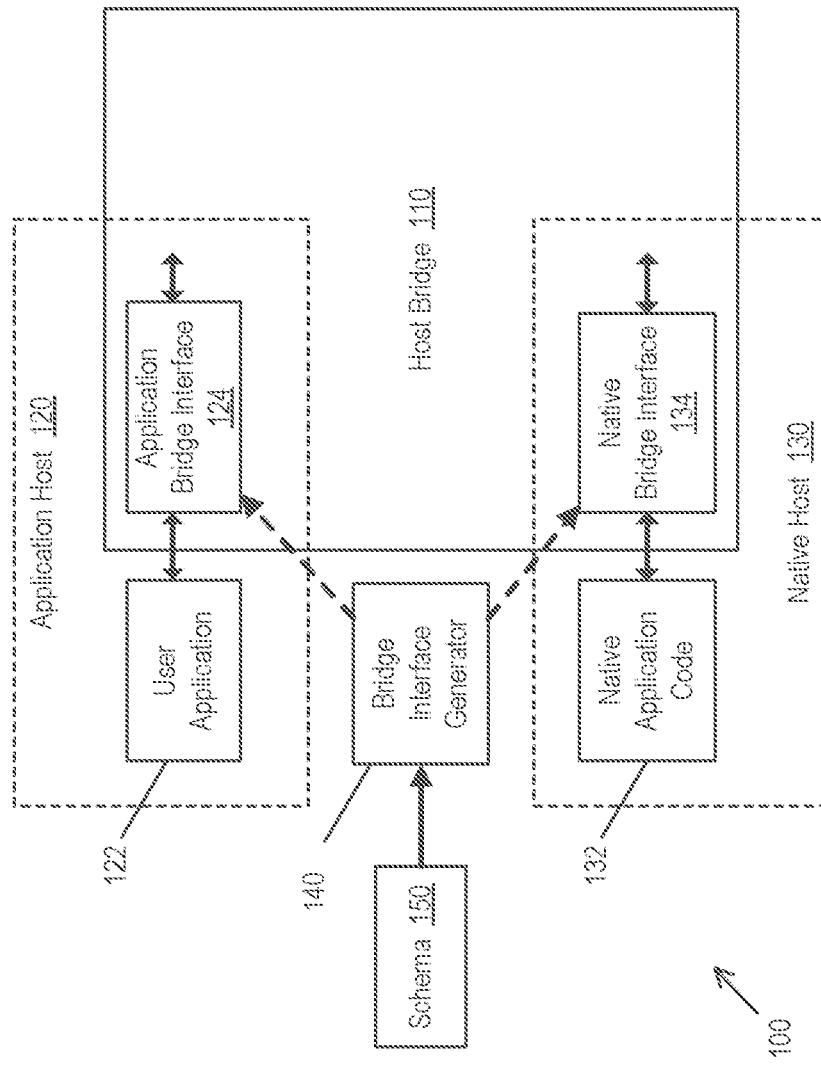
FIG. 1 shows a block diagram of an example of a system configuration in which a host bridge between an application host and a native host may be implemented, according to an example embodiment.

This and many further embodiments for a computing device are described herein. For instance, FIG. 1 shows a block diagram of an example of a system configuration 100 for a host interoperability application in which a host bridge 110 between an application host 120 and a native host 130 may be implemented, according to an example embodiment. The system configuration 100 generally includes the host bridge 110, a bridge interface generator 140, and a schema 150. In various embodiments, the system configuration 100 provides interoperability between different hosts, such as the application host 120 and the native host 130. In some scenarios, a user application 122 (e.g., executable code) executed within the application host 120 is able to make function calls to native application code 132 within the native host 130 (e.g., invoke host functions of native host 130) and receive corresponding return values, as described herein. In other scenarios, events that occur within, or are communicated to, the native host 130 are communicated to the user application 122, as described herein.

The host bridge 110 is an application, executable, service, or other suitable module that is configured to marshal and demarshal software objects, data, or other information for transfer between the application host 120 and the native host 130. More specifically, the host bridge 110 provides a communication channel between the application host 120 and the native host 130 for transferring messages or information, such as data structures representing arguments for a function call or return values from the function call. The data structures may also represent event notifications to be transferred between the application host 120 and the native host 130. In some embodiments, the host bridge 110 converts function calls, arguments for function calls, software objects, event notifications, or other data originating from either of the application host 120 or the native host 130 into a common data structure that is readable by both the application host 120 and the native host 130. Examples of the common data structure may include JavaScript Object Notation (JSON) strings, extensible markup language (XML) strings, or other suitable data formats that are common to both the application host 120 and the native host 130. In scenarios where the function call provides a return argument or result, the host bridge 110 converts the return argument or result into a common data structure. In a similar manner, the host bridge 110 converts event notifications from the native host 130 into a common data structure for transmission to the user application 122, as described herein. The host bridge 110 wraps the messages and events within JSON envelopes which identify a data type being provided by the common data structure.

The application host 120 may utilize a first programming language, such as TypeScript, JavaScript, ECMAScript, or other suitable language, while the native host 130 may utilize a second programming language that is different from the first programming language, such as C++, C#, Java, or another suitable programming language. The application host 120 generally provides an operating or "runtime" environment, script host, or virtual machine in which the user application 122 (and other applications, libraries, etc., implemented using the first programming language of the application host 120) may be executed. In some embodiments, the user application 122 provides a user interface and the application host 120 may include one or more user interface libraries, such as React.js libraries.

In the embodiments described herein, the first programming language is TypeScript and examples of the application host 120 may include V8 from Google, Node.js, Deno, JavaScriptCore, or other suitable application hosts, script hosts, or runtime environments for TypeScript or TypeScript-compatible programming languages. In a similar manner, the native host 130 provides an operating or "runtime" environment or virtual machine in which the native application code 132 (and other applications, libraries, etc. implemented using the first programming language of the native host 130) may be executed. In the embodiments described herein, the second programming language is C++ and examples of the native host 130 include Windows Runtime (WinRT) or other suitable environments. In some embodiments, the native host 130 is not utilized and the native application code 132 is a standalone executable file, dynamically linked library (DLL), or other suitable code.

Examples of the native application code 132 may include portions of the Windows API, in some embodiments. In some embodiments, the native application code 132 is only a portion of a library or other module, such as an individual function.

The first and second programming languages of the application host 120 and native host 130 are generally incompatible in that a second application (or module, library, etc.) written in the second programming language cannot be natively accessed by a first application or module written in the first programming language, absent some form of explicitly designed interface (e.g., application programming interface, API) within the second application. Instead of explicitly designing and implementing the native application code 132 to provide an API that allows access to the native application code 132 from the user application 122, the bridge interface generator 140 is configured to generate i) an application bridge interface 124 between the user application 122 and the host bridge 110, and ii) a native bridge interface 134 between the host bridge 110 and the native application code 132, as described herein.

The application bridge interface 124 is implemented in the first programming language and is executed within the application host 120. Similarly, the native bridge interface 134 is implemented in the second programming language and is executed within the native host 130. This approach allows the user application 122 to be written for the application host 120 (e.g., implemented in the first programming language) and to communicate with a compatible or "familiar" software module (i.e., the application bridge interface 124) when the user application 122 utilizes native application code 132 implemented in the second programming language, which simplifies development of the user application 122. For example, a software developer of the user application 122 does not need to be familiar with detailed implementations of the native host 130 (such as host-specific API calls) to access the native application code 132. Moreover, the native application code 132 does not need to be written in a manner that explicitly provides access to the user application 122. In other words, the native application code 132 may be utilized by other native applications (not shown) executed within the native host 130.

The bridge interface generator 140 utilizes the schema 150 to generate the application bridge interface 124 and the native bridge interface 134. The bridge interface generator 140 may generate the application bridge interface 124 and the native bridge interface 134 at a build time (or compile time) for the user application 122, or at a run time or execution time of the user application 122. The schema 150 is a file or other data structure that identifies the native application code 132, syntax, arguments, return values, and/or return data structure types associated with calling the native application code 132. As described above, the native application code 132 may be a standalone executable file, dynamically linked library (DLL), a portion of an API, or other suitable code. In some embodiments, the schema 150 i) identifies an event within the native host 130, and ii) identifies an event handler function (not shown) within the user application 122 that is configured to handle the event within the application host 120.

Although the application host 120 may be implemented for a scripting language (e.g., JavaScript) as opposed to a compiled language (e.g., C++), the application host 120 may be a different run-time environment for a different type of programming language, in other embodiments. For example, the host bridge 110 may provide a communication channel between applications written using Java within a Java runtime environment (instead of the application host 120) or other suitable programming language and the native host 130.

Figure 2:
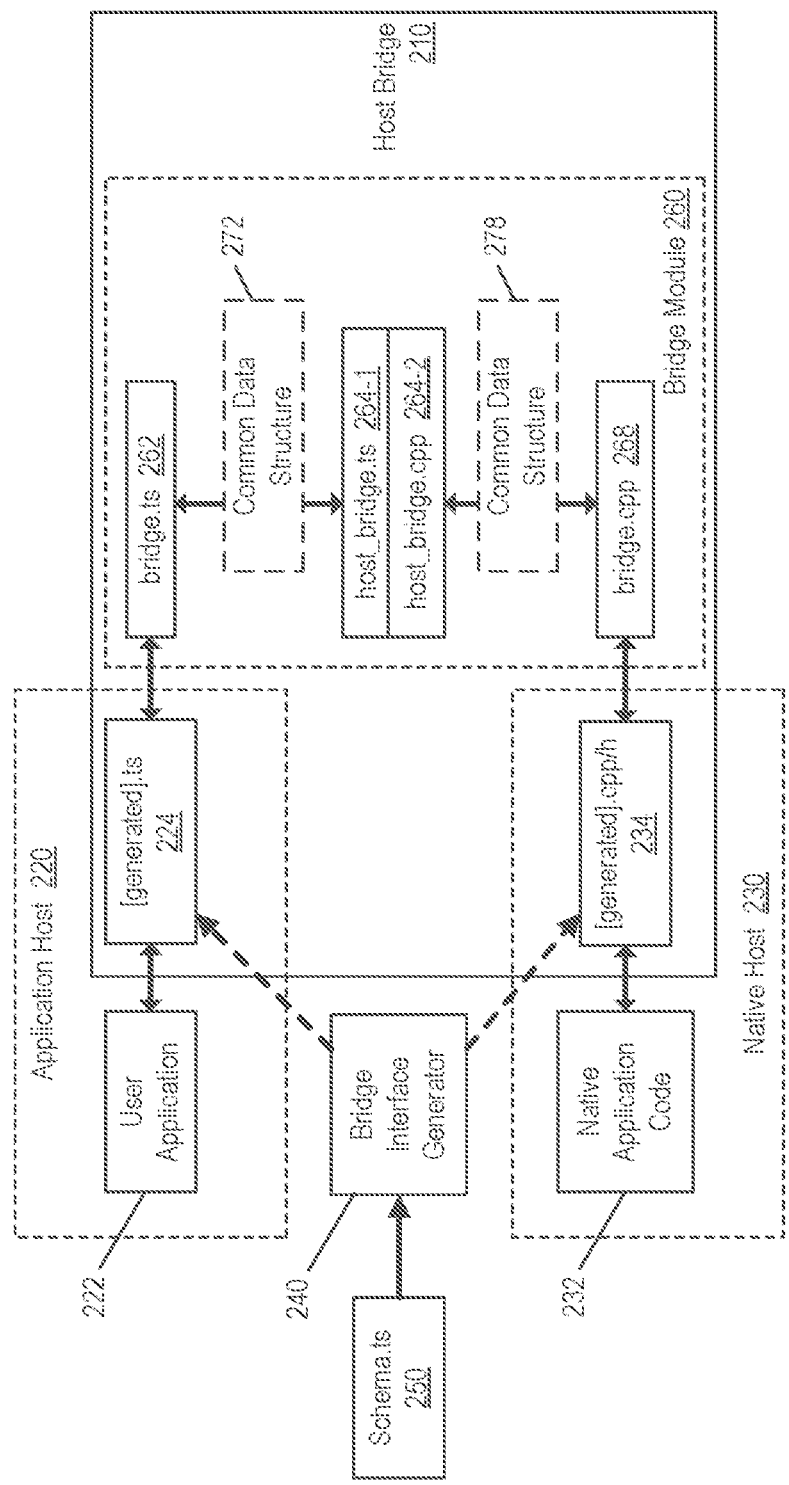
FIG. 2 shows a block diagram of another example of a system configuration in which a host bridge between an application host and a native host may be implemented, according to an example embodiment.

FIG. 2 shows a block diagram of another example of a system configuration 200 for a host interoperability application in which a host bridge 210 between an application host 220 and a native host 230 may be implemented, according to an example embodiment. The system configuration 200 generally includes the host bridge 210, a bridge interface generator 240, and a schema 250 (schema file "Schema.ts"). The host bridge 210, the bridge interface generator 240, and the schema 250 generally correspond to the host bridge 110, the bridge interface generator 140, and the schema 150, respectively. Similarly, the application host 220 and native host 230 generally correspond to the application host 120 and native host 130, respectively.

In some scenarios, the system configuration 200 enables a user application 222 (e.g., executable code) executed within the application host 220 to make function calls to native application code 232 within the native host 230 (e.g., invoke host functions of native host 230) and receive corresponding return values, as described herein. In other scenarios, events that occur within, or are communicated to, the native host 230 are communicated to the user application 222, as described herein. In the embodiment shown in FIG. 2, the host bridge 210 is configured to provide interoperability between TypeScript (the "first programming language" described above) and C++ (the "second programming language" described above). In other words, the application host 220 supports TypeScript, the user application 222 is implemented in TypeScript, the native host 230 supports C++, and the native application code 232 is implemented in C++.

In the embodiment of FIG. 2, the host bridge 210 includes application bridge interface 224 and native bridge interface 234, which are shown as "[generated].ts" and "[generated].cpp/h" for the TypeScript/C++ embodiment. In other words, the application bridge interface 224 is i) implemented in TypeScript, and ii) executed within the application host 220, and the native bridge interface 234 is i) implemented in C++, and ii) executed within the native host 230. The application bridge interface 224 and the native bridge interface 234 generally correspond to the application bridge interface 124 and the native bridge interface 134, respectively. The application bridge interface 224 includes a first function to be called by the user application 222 to request execution of the native application code 232. The application bridge interface 224 may also include a second function to be called to process a received common data structure, for example, to extract a return value or return structure from the received common data structure, as described herein. The native bridge interface 234 includes a first function to be called to create a native data structure. The native bridge interface 234 sets the native data structure to include one or more arguments parsed from a received common data structure (e.g., the common data structure 278). In contrast to the common data structure that is readable by both the application host 220 and the native host 230, the native data structure may be specific to the native host 230. For example, the native data structure may be a C++ class or object, C++ variable, etc. In an embodiment, the application bridge interface 224 and the native bridge interface 234 cooperate to convert a TypeScript-specific variable, object, or other data structure into a corresponding variable, object, or other data structure that is specific to C++. For example, a "Number" in TypeScript may be converted into a "Double" in C++, a TypeScript String may be converted into a std::String (i.e., a Standard Template Library String), etc. The application bridge interface 224 and the native bridge interface 234 cooperate to convert C++-specific data structures to corresponding TypeScript data structures in a similar manner (e.g., for return data structures or return values from execution of a C++ function).

The host bridge 210 also includes a bridge module 260, which is a reusable module having several components that enable communication between the application host 220 and the native host 230. In some embodiments, the bridge module 260 supports multiple instances of the application host 220 and/or the native host 230. The components within the bridge module 260 are "general purpose" in that they are configured for communication between the application host 220 and the native host 230, but do not contain code that is specific to a particular user application (e.g., user application 222) or specific to particular native application code (e.g., native application code 232). Instead, code that is specific to the user application 222 is generated by the bridge interface generator 240 as the application bridge interface 224 using the schema 250, and code that is specific to the native application code 232 is generated by the bridge interface generator 240 as the native bridge interface 234 using the schema 250. Accordingly, the application bridge interface 224 communicates between the user application 222 and the bridge module 260, and the native bridge interface 234 communicates between the native application code 232 and the bridge module 260. In some scenarios, this approach reduces a memory footprint of the system configuration 200 because interfaces for an entire library or list of events need not be loaded, instead only interfaces for functions or events utilized by the user application 222 are loaded. Additionally, this approach simplifies development of the user application 222 because the user application does not need to be configured to communicate directly with the bridge module 260. Moreover, this approach simplifies future updates or changes to the bridge module 260 because direct calls from the user application 222 to the bridge module 260 are not made, so changes to the bridge module 260 do not require changes to the user application 222 or the native application code 232.

Similarly to the host bridge 110, the host bridge 210 converts function calls, arguments for function calls, software objects, event notifications, or other data into a common data structure that is readable by both the application host 220 and the native host 230. The bridge module 260 includes an external interface 262 ("bridge.ts") for the first programming language and is itself implemented in the first programming language. The external interface 262 is configured to generate a common data structure 272 (e.g., using JSON) from data received from the application bridge interface 224 and provide the common data structure 272 to a conversion module 264. In an embodiment, for example, the external interface 262 calls JSON.stringify( ) (or other suitable function) to generate a JSON structure (e.g., JSON string) as the common data structure 272. For asynchronous function calls, such as when processing by the native application code 232 may need to be performed as a background task, the external interface 262 creates a TypeScript promise object, to be updated when a common data structure is returned from the conversion module 264.

The conversion module 264 is a host-specific module in that it is configured to marshal the common data structure 272 from system resources (e.g., memory addresses) associated with the application host 220 to system resources (e.g., memory addresses) associated with the native host 230, for example, as common data structure 278. The conversion module 264 may include both a TypeScript portion 264-1 ("host_bridge.ts") and a C++ portion 264-2 ("host_bridge.cpp") for marshalling common data structures.

In some embodiments, the C++ portion 264-2 ("host_bridge.cpp") registers a callback for WebMessages by calling an add_WebMessageReceived method of an ICoreWebView2 object. The TypeScript portion 264-1 ("host_bridge.ts") may call window.chrome.webview.postMessage with the common data structure 272 to transfer the common data structure 272 to the C++ portion 264-2 ("host_bridge.cpp") of the conversion module 264. The C++ portion 264-2 ("host_bridge.cpp") may receive an ICoreWebView2WebMessageReceivedEventArgs object (i.e., through the callback registration above), call the object's corresponding get_WebMessageAsJson method, and receive a JSON structure, specifically, the common data structure 278.

In some embodiments, the conversion module 264 is configured to interact with a V8 JavaScript engine as the application host 120. For example, the conversion module 264 may include a JavaScript portion (analogous to the TypeScript portion 264-1) and a C++ portion (analogous to the C++ portion 264-2), where the C++ portion accesses parameters via the V8::FunctionCallbackInfo object. In one aspect, these parameters could be used to receive a JSON serialized common data. In another implementation, the native bridge interface 234 may use knowledge of the schema 150 and the V8 engine to convert parameters to native data structures.

The bridge module 260 includes an external interface 268 for the second programming language ("bridge.cpp") and is itself implemented in the second programming language. The external interface 268 is configured to parse the common data structure received from the conversion module 264 for identification of the native bridge interface 234 (or a function therein) and provide the common data structure 278 to the native bridge interface 234. In an embodiment, the external interface 268 parses the common data structure 278 to obtain key/value pairs as C++ strings and passes the C++ strings to the native bridge interface 234. The native bridge interface 234 may then create a C++ data structure as the native data structure with the received key/value pairs and then call the native application code 232, where the native data structure is generally the arguments and/or parameters expected by the native application code 232. Similarly, for a return from a function call to the native application code 232, the external interface 268 is configured to generate an instance of the common data structure 278 from data received from the native bridge interface 234 and provide the common data structure 278 to the conversion module 264, for conversion to an instance of the common data structure 272 to be utilized by the external interface 262. The external interface 262 may then call JSON.parse( ) on the common data structure 272 and update the callback structure.

Figure 3:
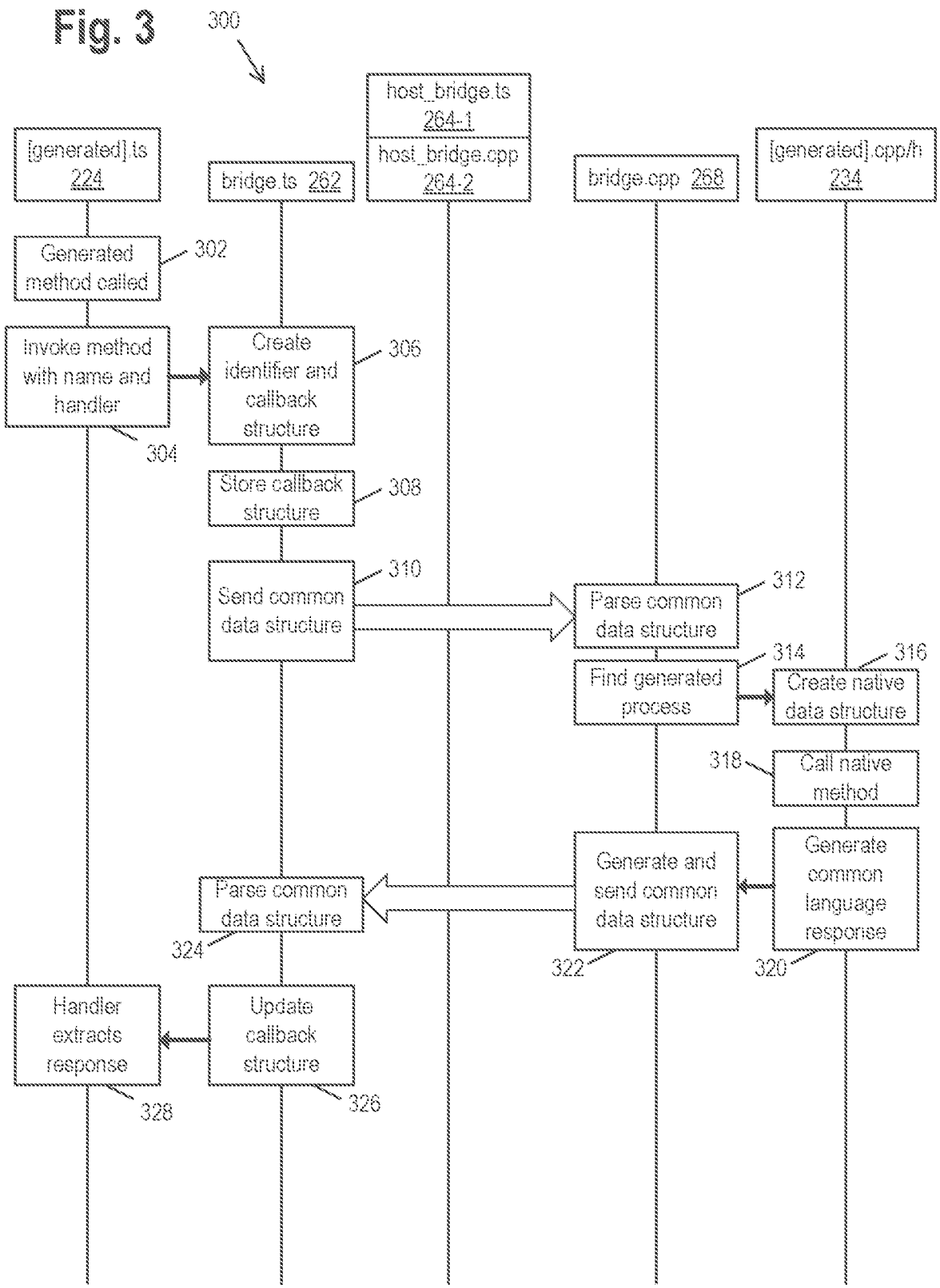
FIG. 3 shows a diagram of an example process flow for bridging a function call, according to an example embodiment.

FIG. 3 shows a diagram of an example process flow 300 for bridging a function call, according to an example embodiment. The function call originates in the application host 220 and is bridged to the native host 230 for processing by the native application code 232. The process flow 300 is performed by corresponding components of the host bridge 210, for example, the application bridge interface 224, the external interface 262, the conversion module 264, the external interface 268, and the native bridge interface 234.

At step 302, the user application 222 makes a function call to the application bridge interface 224, for example, to a function generated within the application bridge interface 224. The function call may include one or more arguments and also corresponds to a function that is implemented in the second programming language. For example, the user application 222 may include a function call:

returnValue=GetWindowMessageTS(windowID)

where returnValue is a TypeScript String and windowID is a TypeScript Number. The function GetWindowMessageTS (windowID) is a TypeScript function implemented within the application bridge interface 224. The TypeScript function GetWindowMessageTS may correspond to a C++ function within native application code 232 and declared as:

String GetWindowMessageNative(double windowID);

At step 304, the application bridge interface 224 (via the GetWindowMessageTS function) uses the bridge module 260 to invoke the C++ function GetWindowMessageNative. The invocation includes an identification of an argument handler function associated with the function call to the application bridge interface 224. For example, the invocation may identify a GetWindowMessageTSargHandler function configured to extract a return data structure from a received common data structure (e.g., common data structure 272).

At step 306, an identifier for the function call, a callback structure for the function call, and a common data structure are generated. The callback structure may be a TypeScript promise object or other suitable data structure. The common data structure may be a JSON envelope, for example at step 308, the callback structure is stored for retrieval after a response is received. At step 310, the common data structure is sent to the external interface 268 via the conversion module 264.

At step 312, the external interface 268 parses the common data structure to extract data stored within the common data structure and at step 314, the external interface 268 identifies a generated function within the native bridge interface 234 based on the extracted data. For example, the extracted data may identify a C++ function GetWindowMessageCpp within the native bridge interface 234.

At step 316, the external interface 268 calls the GetWindowMessageCpp function within the native bridge interface 234 using arguments extracted from the common data structure and the GetWindowMessageCpp function generates a native data structure for the arguments. For example, the GetWindowMessageCpp function creates a C++ double variable from the extracted arguments (e.g., double windowID). At step 318, the GetWindowMessageCpp function calls the function of the native application code 232 using the native data structure, for example, GetWindowMessageNative(double windowID). Although the argument in the present example is a simple data type, the argument may be a C++ class, object, or other suitable data type in other embodiments.

At step 320, the native bridge interface 234 generates a common language response based on a return value or return data structure from execution of the native application code 232. The common language response may be a JSON object or JSON string, in various embodiments. For example, where the GetWindowMessageNative returns a std::String, the native bridge interface 234 may generate a JSON String and set its value to correspond to the returned std::String. At step 322, the external interface 268 generates a common data structure (e.g., common data structure 278) that includes the common language response and sends the common data structure to the external interface 262 (via the conversion module 264).

At step 324, the external interface 262 parses the common data structure from the conversion module 264 to identify the argument handler function associated with the function call to the application bridge interface 224, for example, using a JSON.parse( ) or other suitable function. At step 326, the external interface 262 updates the callback structure (e.g., TypeScript promise object) based on the parsed data from the common data structure.

At step 328, the argument handler function associated with the function call to the application bridge interface 224 is called by the external interface 262 to extract a return data structure from a received common data structure (e.g., common data structure 272). For example, the external interface 262 may call the GetWindowMessageTSargHandler function, which extracts a JSON string from the common data structure 272 and sets a value of a TypeScript string based on the extracted JSON string.

Figure 4:
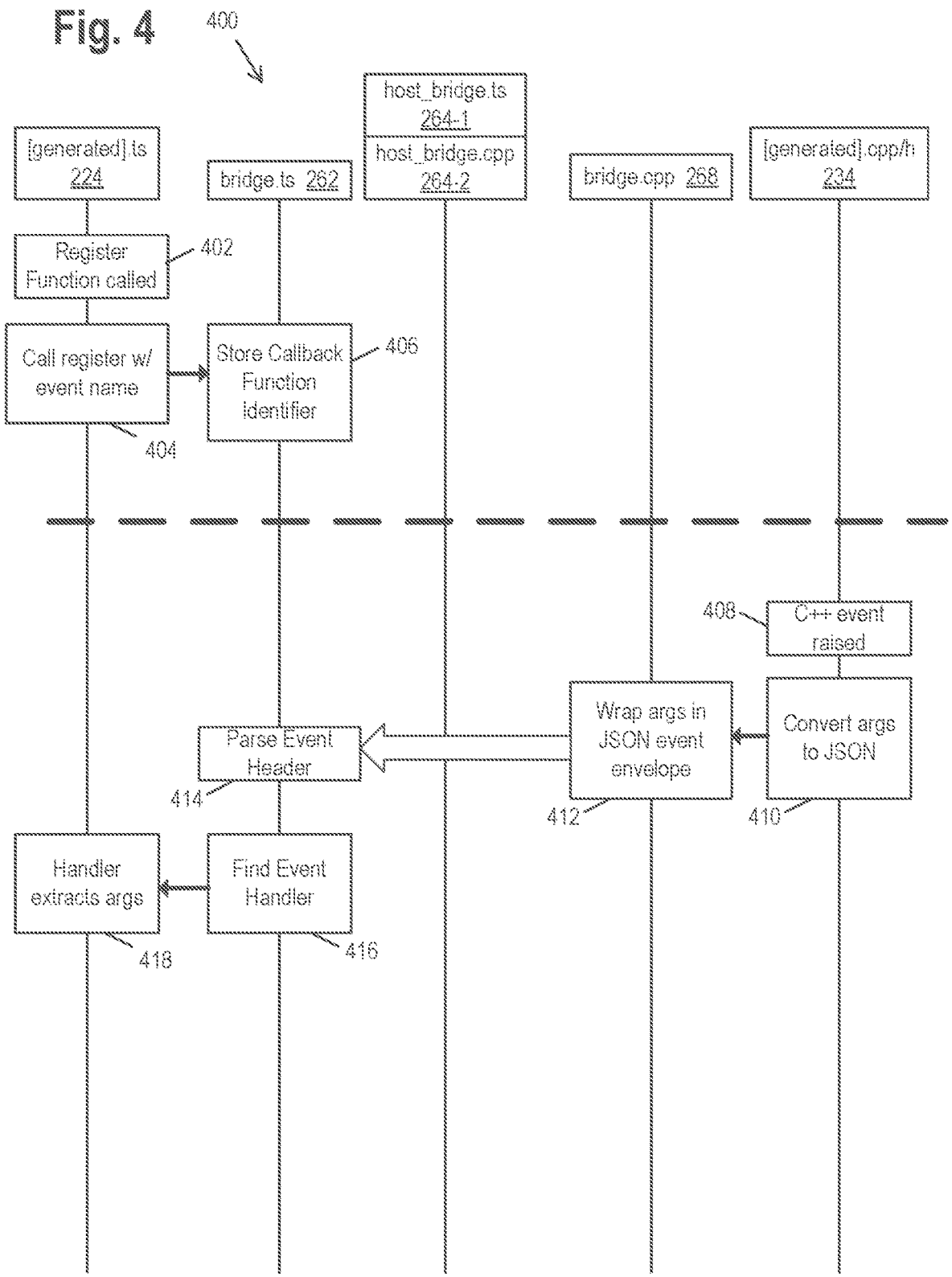
FIG. 4 shows a diagram of an example process flow for bridging an event, according to an example embodiment.

FIG. 4 shows a diagram of an example process flow 400 for bridging an event, according to an example embodiment. The event, or corresponding event notification, originates in the native host 230 and is bridged to the application host 220 for processing by the user application 222. The process flow 400 is performed by corresponding components of the host bridge 210, for example, the application bridge interface 224, the external interface 262, the conversion module 264, the external interface 268, and the native bridge interface 234.

At step 402, the user application 222 makes a function call to the application bridge interface 224, for example, to an event registration function generated within the application bridge interface 224. In this embodiment, the function call is configured to register an event handler function within the user application 222. The event handler function is configured to handle an event that occurs (or is communicated to) the native host 230, but the event handler function itself is executed within the application host 220. The application bridge interface 224 also includes an event argument handler function configured to extract arguments provided with an event from a common data structure.

At step 404, the event registration function provides an identifier of the event handler function and an identifier of the event handled by the event handler function to the external interface 262. At step 406, the external interface 262 stores the identifier of the event handler function, to be used when an event notification corresponding to the identifier of the event is received. In some embodiments, the external interface 262 creates a registration as a "listener" for the event with the native host 230, for example, to associate the event with an event receiver function. The registration includes an identifier of the event receiver function of the native bridge interface 234 that is configured to receive notifications of the event from the native host 230.

At step 408, the event receiver function for the event is called by the native host 230. At step 410, the event receiver function converts one or more arguments received from the native host 230 into a common language response. The common language response may be a JSON object or JSON string, in various embodiments. At step 412, the external interface 268 generates a common data structure (e.g., common data structure 278) that includes the common language response and sends the common data structure to the external interface 262 (via the conversion module 264).

At step 414, the external interface 262 parses the common data structure from the conversion module 264. At step 416, the external interface 262 identifies the event argument handler function, for example, based on parsed data from the common data structure. At step 418, the event argument handler function is called by the external interface 262 to extract data for an application data structure (e.g., a TypeScript data structure) to be passed to the event handler function of the user application 222.

Figure 5:
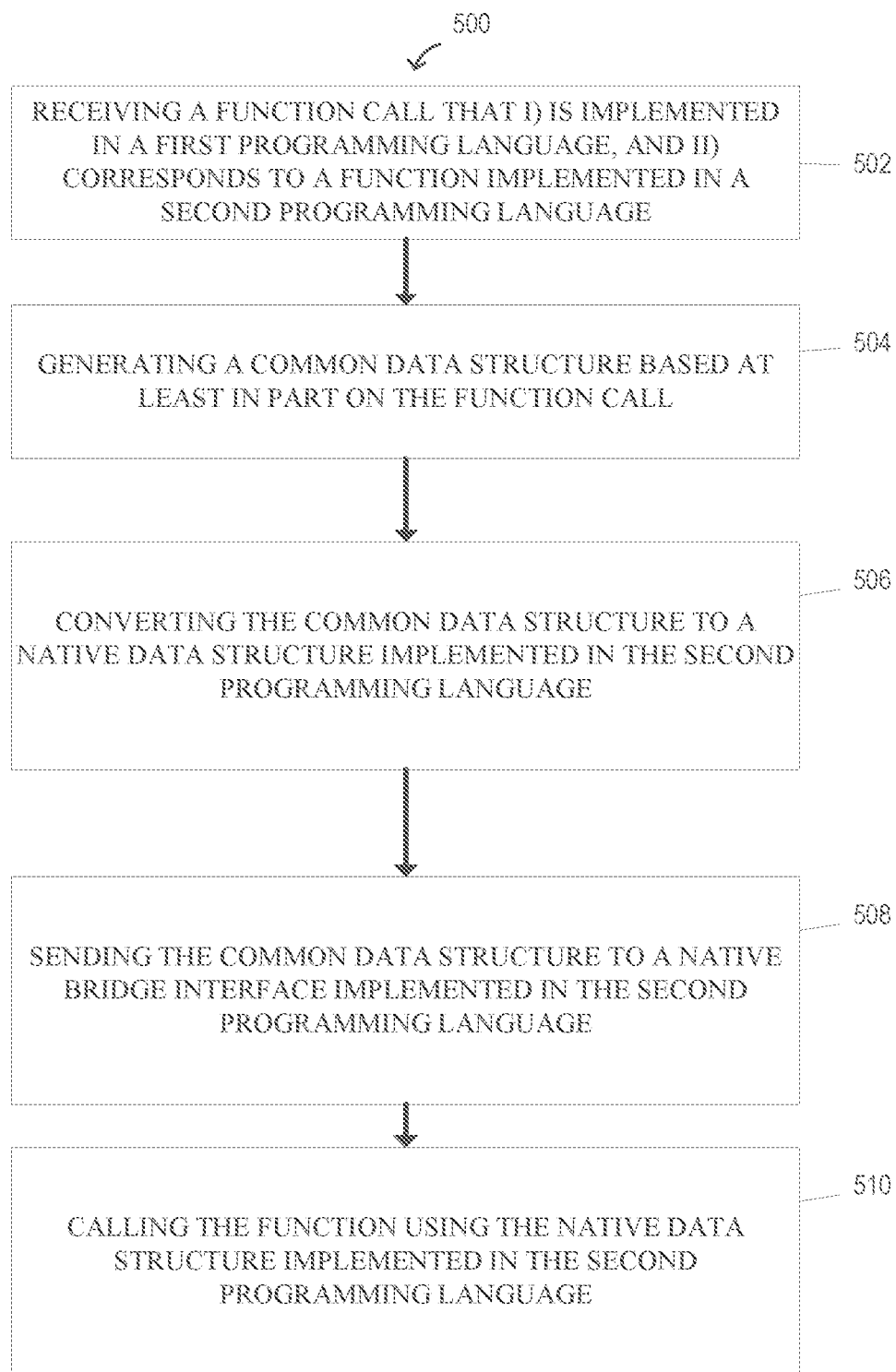
FIG. 5 shows a flowchart of an example method for function call invocation, according to an example embodiment.

FIG. 5 shows a flowchart of an example method 500 for function call invocation, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the system configuration 100 (e.g., via the host bridge 110, bridge interface generator 140, etc.), the system configuration 200 (e.g., via the host bridge 210, the bridge interface generator 240, etc.), or other suitable computing device.

Method 500 begins with step 502. At step 502, a function call is received where the function call is implemented in a first programming language, and corresponds to a function implemented in a second programming language. The first programming language is different from the second programming language. In an embodiment, the function call corresponds to the function call at step 302, received by the application bridge interface 124 or application bridge interface 224, for example. The function call may be received from a user application that is implemented in the first programming language, and executed within an application host for the first programming language. For example, the function call may be received from the user application 222 within the application host 220. Moreover, the function may be called for execution within the native host 230 for the second programming language. In some embodiments, the application bridge interface implements the function call and receives the function call within the application host from the user application. The application host may be a script host and the first programming language may be a TypeScript-compatible programming language, for example.

At step 504, a common data structure is generated based at least in part on the function call received by the application bridge interface. For example, the common data structure 272 and common data structure 278 are generated, generally corresponding to step 306. The common data structure is readable in both the application host and the native host, for example. The function call may include the one or more arguments associated with calling the function and the common data structure may be generated to include the one or more arguments associated with calling the function.

At step 506, the common data structure is sent to a native bridge interface implemented in the second programming language. In an embodiment, step 508 corresponds to step 310. For example, the common data structure 278 is sent to the native bridge interface 234.

At step 508, the common data structure is converted to a native data structure implemented in the second programming language. In an embodiment, step 508 corresponds to step 316 and the external interface 268 converts the native data structure 278 into the native data structure. Converting the common data structure may include setting, by the native bridge interface within the native host, the native data structure to include the one or more arguments from the common data structure.

At step 510, the function is called using the native data structure implemented in the second programming language. In an embodiment, step 510 corresponds to step 318.

The method 500 may further comprise: processing a schema that identifies the function as native application code and identifies one or more arguments and a return data structure type that are associated with calling the function; generating, based on the schema, the application bridge interface, wherein the application bridge interface is executed within the application host and communicates between the user application and the bridge module; and generating, based on the schema, the native bridge interface, wherein the native bridge interface is executed within the native host and communicates between the bridge module and the native host. For example, the bridge interface generator 240 may process the schema 250 and the native application code may correspond to the native application code 232. The schema may be processed at a run time of the user application, or at a build time of the user application.

In some embodiments, the method 500 may further comprise: receiving, at the native bridge interface, a return data structure that is implemented in the second programming language, and is returned by an execution of the function within the native host with the one or more arguments of the native data structure; converting, by the native bridge interface within the native host, the return data structure to a second common data structure that is readable in both the application host and the native host; and converting, by the application bridge interface within the application host, the common data structure to an application data structure that is readable by the user application. For example, the native bridge interface 234 may receive the return data structure and convert it to the common data structure 278.

Figure 6:
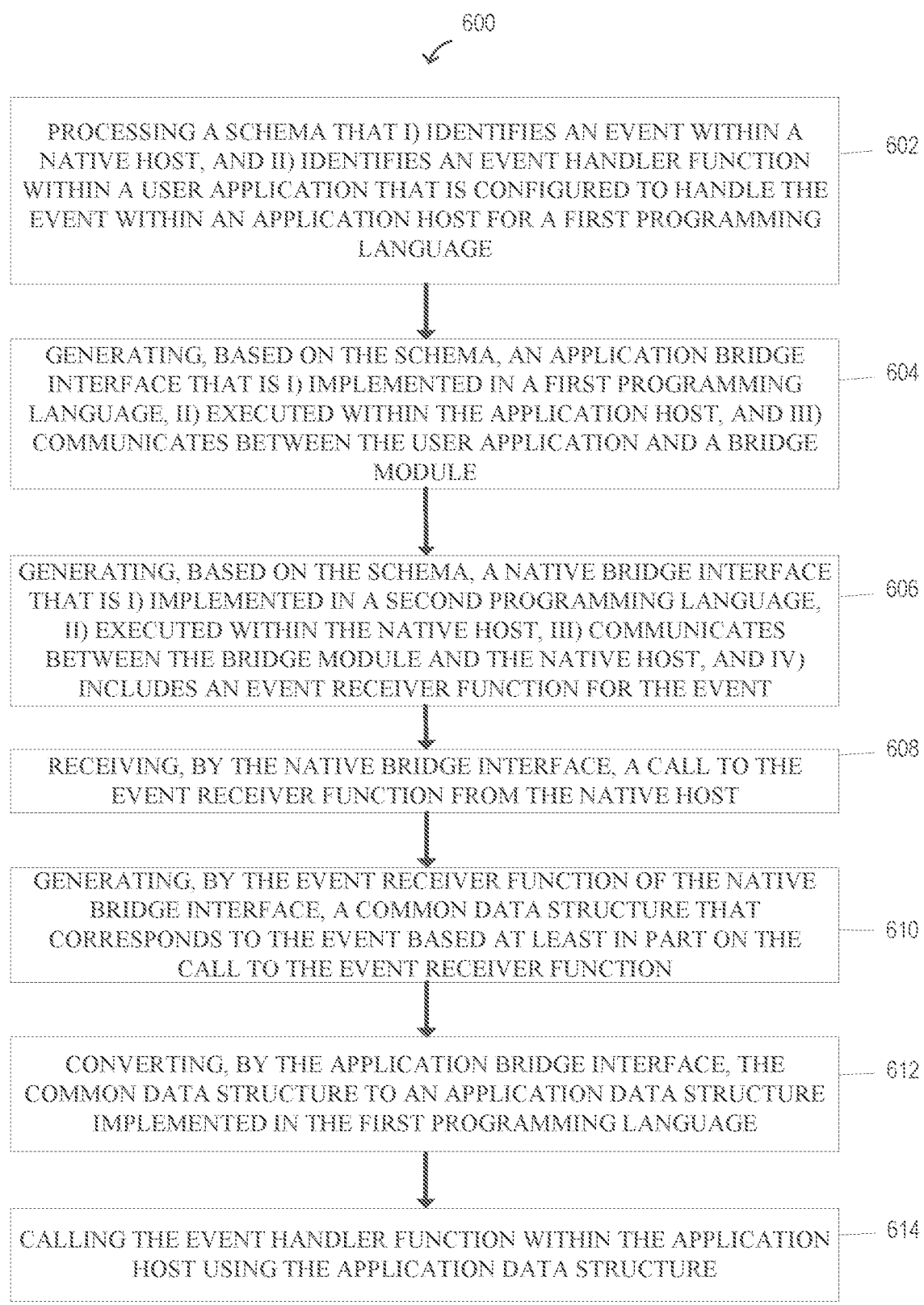
FIG. 6 shows a flowchart of another example method for event processing, according to an example embodiment.

FIG. 6 shows a flowchart of an example method 600 for event processing, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 6. Steps may be performed serially, in a partially overlapping manner, or fully in parallel. Thus, the order in which steps of method 600 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 6 may be performed by the system configuration 100 (e.g., via the host bridge 110, bridge interface generator 140, etc.), the system configuration 200 (e.g., via the host bridge 210, the bridge interface generator 240, etc.), or other suitable computing device.

Method 600 begins with step 602. At step 602, a schema is processed, where the schema identifies an event within a native host, and identifies an event handler function within a user application that is configured to handle the event within an application host for a first programming language. In an embodiment, the schema corresponds to the schema 150 or schema 250, which is processed by the bridge interface generator 140 or bridge interface generator 240.

At step 604, an application bridge interface is generated based on the schema, where the application bridge interface is implemented in a first programming language, executed within the application host, and communicates between the user application and a bridge module. For example, the bridge interface generator 240 generates the application bridge interface 224 based on the schema 250.

At step 606, a native bridge interface is generated based on the schema, where the native bridge interface is implemented in a second programming language, executed within the native host, communicates between the bridge module and the native host, and iv) includes an event receiver function for the event. The first programming language is different from the second programming language. For example, the bridge interface generator 240 generates the native bridge interface 234 based on the schema 250.

At step 608, a call to the event receiver function is received by the native bridge interface from the native host. For example, the event receiver function is called as described above with respect to step 408. The call to the event receiver function may include one or more arguments for the event.

At step 610, a common data structure that corresponds to the event is generated by the event receiver function of the native bridge interface based at least in part on the call to the event receiver function. For example, step 610 may correspond to step 410 and the common data structure 278 is generated by the native bridge interface 234. The common data structure may be generated to include the one or more arguments for the event.

At step 612, the common data structure is converted by the application bridge interface to an application data structure implemented in the first programming language. For example, the application bridge interface 224 converts the common data structure 272 to an application data structure. The conversion may correspond to step 412, for example. The application data structure may be converted by generating the application data structure to include the one or more arguments for the event.

At step 614, the event handler function is called within the application host using the application data structure. For example, step 614 may correspond to step 418.

In some embodiments, the method 600 further comprises: receiving, by the application bridge interface from the user application, a call to an event registration function that is implemented in the first programming language within the application bridge interface, and corresponds to the event receiver function within the native bridge interface; and associating the event with the event receiver function within the native bridge interface. For example, the application bridge interface 224 may receive the call to the event registration function generated within the application bridge interface 224, as described above in step 402.

Figure 7:
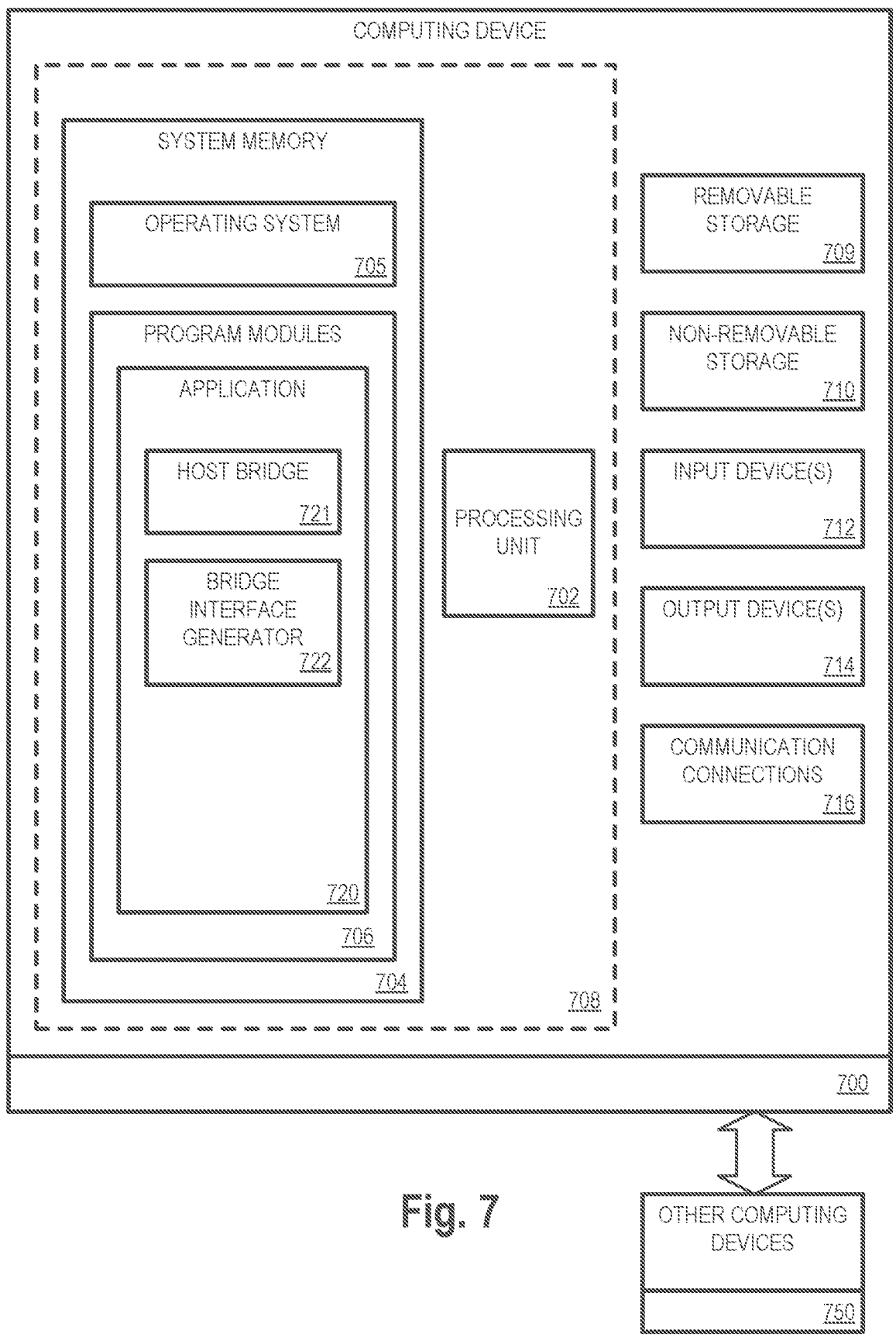
FIG. 7 is a block diagram illustrating example physical components of a computing device with which aspects of the disclosure may be practiced.
Figure 8:
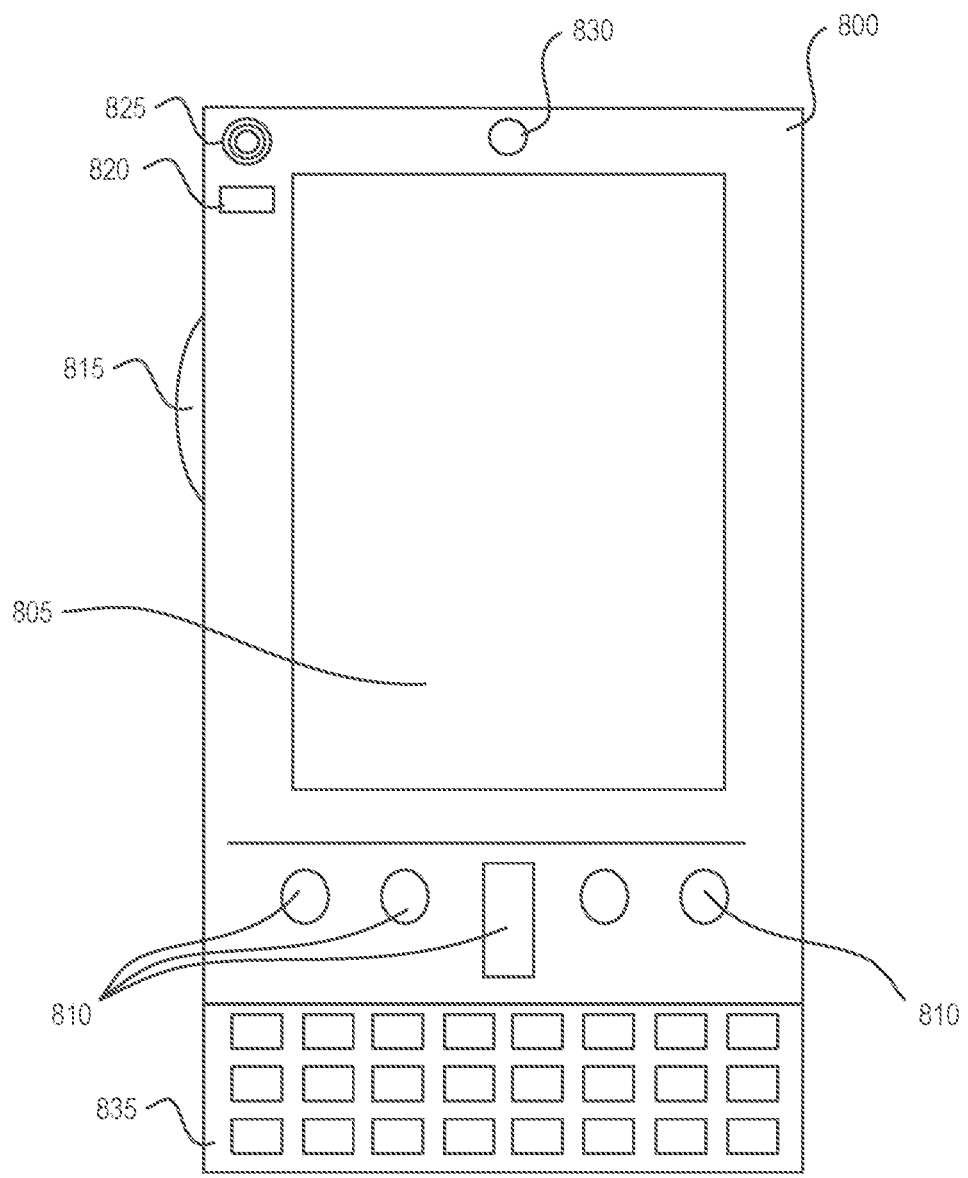
FIGS. 8 and 9 are simplified block diagrams of a mobile computing device with which aspects of the present disclosure may be practiced.
Figure 9:
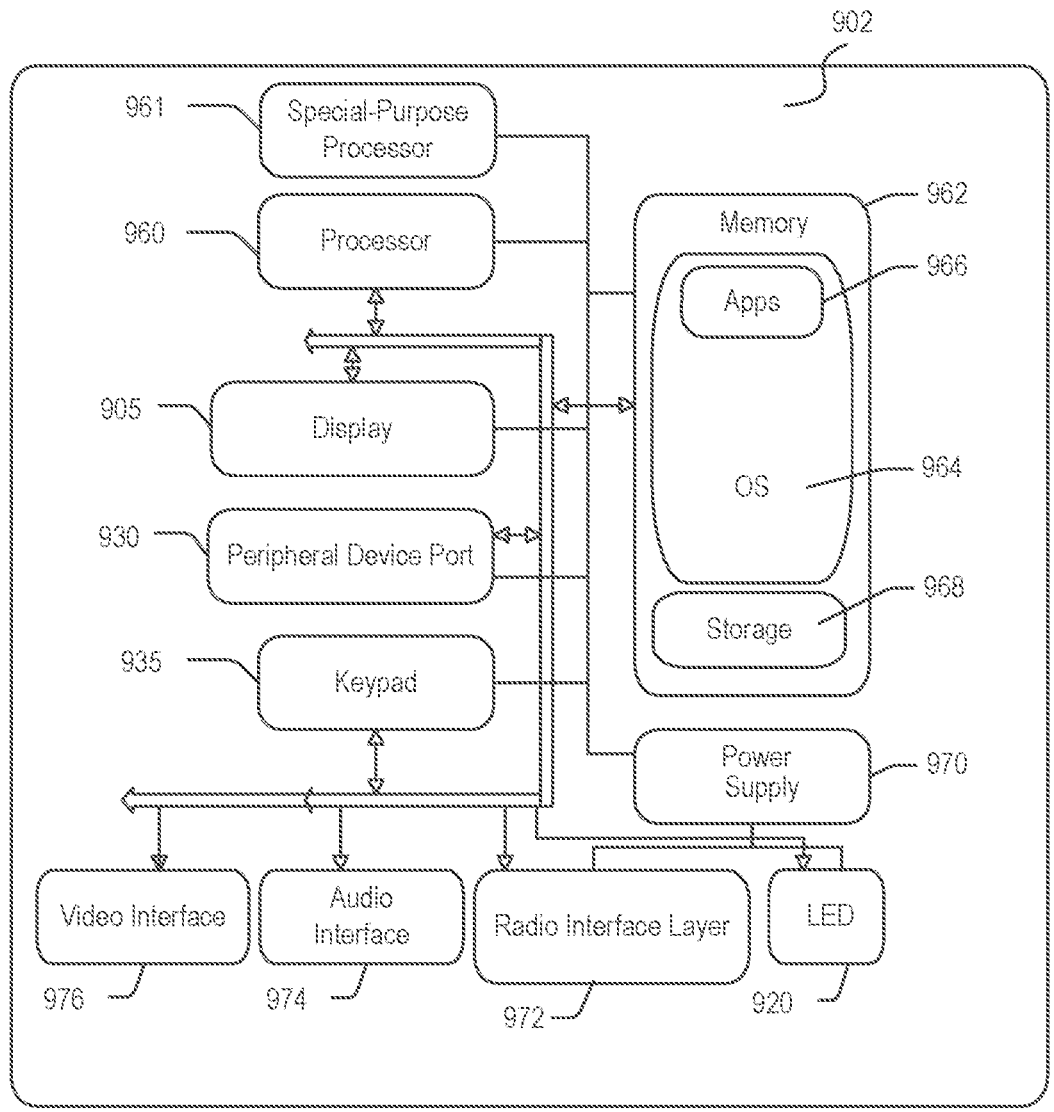

FIGS. 7, 8, and 9 and the associated descriptions provide a discussion of a variety of operating environments in which aspects of the disclosure may be practiced. However, the devices and systems illustrated and discussed with respect to FIGS. 7, 8, and 9 are for purposes of example and illustration and are not limiting of a vast number of computing device configurations that may be utilized for practicing aspects of the disclosure, as described herein.

FIG. 7 is a block diagram illustrating physical components (e.g., hardware) of a computing device 700 with which aspects of the disclosure may be practiced. The computing device components described below may have computer executable instructions for implementing a host interoperability application 720 on a computing device, including computer executable instructions for host interoperability application 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running host interoperability application 720, such as one or more components with regard to FIGS. 1 and 3 and, in particular, host bridge 721 (e.g., corresponding to host bridge 110, host bridge 210), and bridge interface generator 722 (e.g., corresponding to bridge interface generator 140, bridge interface generator 240).

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., host interoperability application 720) may perform processes including, but not limited to, the aspects, as described herein. Other program modules that may be used in accordance with aspects of the present disclosure, and in particular for performing function call invocation and event handling, may include host bridge 721 and bridge interface generator 722.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8 and 9 illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 9 is a block diagram illustrating the architecture of one aspect of a mobile computing device. That is, the mobile computing device 800 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer.

The system 902 has a power supply 970, which may be implemented as one or more batteries. The power supply 970 may further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer 825 (e.g., audio transducer 825 illustrated in FIG. 8). In the illustrated embodiment, the visual indicator 920 is a light emitting diode (LED) and the audio transducer 825 may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of peripheral device 930 (e.g., on-board camera) to record still images, video stream, and the like.

A mobile computing device 800 implementing the system 902 may have additional features or functionality. For example, the mobile computing device 800 may also include additional data storage devices (removable and/or non-removable) such as, magnetic disks, optical disks, or tape. Such additional storage is illustrated in FIG. 9 by the non-volatile storage area 968.

Data/information generated or captured by the mobile computing device 800 and stored via the system 902 may be stored locally on the mobile computing device 800, as described above, or the data may be stored on any number of storage media that may be accessed by the device via the radio interface layer 972 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 8 and 9 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for function call invocation, the method comprising:

generating, by a host bridge based on a schema, first and second functions of an application bridge interface implemented in a first programming language and executed within an application host, wherein the schema defines the first function for communicating data between a first user application and a reusable bridge module of the host bridge, wherein the schema defines the second function for communicating data between a second user application and the reusable bridge module;

generating, by the host bridge based on the schema, third and fourth functions of a native bridge interface implemented in a second programming language and executed within a native host, wherein the first programming language is different from the second programming language, wherein the schema defines the third function for communicating data between the reusable bridge module and a first native function of the native host, wherein the schema defines the fourth function for communicating data between the reusable bridge module and a second native function of the native host;

receiving, from the first user application via the application bridge interface, a function call to the first function that corresponds to the third function, and wherein the first user application is executed within the application host in the first programming language;

generating, by the reusable bridge module of the host bridge, a first common data structure based at least in part on the function call to the first function; and sending, by the reusable bridge module of the host bridge, the first common data structure to the third function of the native bridge interface, wherein the third function converts the first common data structure to a first native data structure implemented in the second programming language and calls the first native function within the native host using the first native data structure;

receiving, from the second user application via the application bridge interface, a function call to the second function that corresponds to the fourth function, wherein the second user application is executed within the application host in the first programming language;

generating, by the reusable bridge module of the host bridge, a second common data structure based at least in part on the function call to the second function; and sending, by the reusable bridge module of the host bridge, the second common data structure to the fourth function of the native bridge interface, wherein the fourth function converts the second common data structure to a second native data structure implemented in the second programming language and calls the second native function within the native host using the second native data structure.

2. The method of claim 1, wherein the first common data structure and the second common data structure are readable in both the application host and the native host.

3. The method of claim 2, wherein the application host is a script host and the first programming language is a TypeScript-compatible programming language.

4. The method of claim 2 wherein processing the schema comprises processing the schema at a run time of the first user application.

5. The method of claim 2 wherein processing the schema comprises processing the schema at a build time of the first user application.

6. The method of claim 2 wherein the function call to the first function includes one or more arguments associated with calling the first native function, and wherein generating the first common data structure comprises generating, using the reusable bridge module, the first common data structure to include the one or more arguments associated with calling the first native function.

7. The method of claim 6, wherein the native bridge interface sets, within the native host, the first native data structure to include the one or more arguments from the first common data structure.

8. The method of claim 7, wherein:
the application bridge interface implements the function call to the first function; and
the application bridge interface receives, within the application host, the function call to the first function, from the user application.

9. The method of claim 7, wherein:
the native bridge interface receives a first return data structure that is implemented in the second programming language, and is returned by an execution of the third function within the native host with the one or more arguments of the first native data structure;
the native bridge interface converts, within the native host, the first return data structure to a third common data structure that is readable in both the application host and the native host; and
the application bridge interface converts, within the application host, the third common data structure to a first application data structure that is readable by the first user application.

10. The method of claim 1, wherein:
generating, by the reusable bridge module of the host bridge, the first common data structure comprises generating, by a first external interface of the reusable bridge module, the first common data structure;
wherein the method further comprises:
providing, by the first external interface, the first common data structure to a conversion module of the reusable bridge module; and
parsing, by a second external interface of the reusable host bridge, the first common data structure received from the conversion module to identify the native bridge interface, wherein the parsing includes obtaining key/value pairs to the native bridge interface;
wherein sending, by the reusable bridge module of the host bridge, the first common data structure to the third function of the native bridge interface comprises sending, by the reusable bridge module of the host bridge, the first common data structure to the third function of the native bridge interface based on a native data structure created by the native bridge interface using the key/value pairs, wherein the third function converts the first common data structure to the first native data structure and calls the first native function within the native host using the first native data structure, the first native data structure being implemented in the second programming language.

11. A system for function call invocation, the system comprising:
a processor, and
a memory storing computer-executable instructions that when executed by the processor cause the system to:
generate, by a host bridge based on a schema, first and second functions of an application bridge interface implemented in a first programming language and executed within an application host, wherein the schema defines the first function for communicating data between a first user application and a reusable bridge module of the host bridge, wherein the schema defines the second function for communicating data between a second user application and the reusable bridge module;
generate, by the host bridge based on the schema, third and fourth functions of a native bridge interface implemented in a second programming language and executed within a native host, wherein the first programming language is different from the second programming language, wherein the schema defines the third function for communicating data between the bridge module and a first native function of the native host, wherein the schema defines the fourth function for communicating data between the reusable bridge module and a second native function of the native host;
receive, from the first user application via the application bridge interface, a function call to the first function that corresponds to the third function and wherein the first user application is executed within the application host in the first programming language;
generate, by the reusable bridge module of the host bridge, a first common data structure based at least in part on the function call to the first function; and
send, by the reusable bridge module of the host bridge, the first common data structure to the third function of the native bridge interface, wherein the third function converts the first common data structure to a first native data structure implemented in the second programming language, and calls the first native function within the native host using the first native data structure;
receive, from the second user application via the application bridge interface, a function call to the second function that corresponds to the fourth function, wherein the second user application is executed within the application host in the first programming language;
generate, by the reusable bridge module of the host bridge, a second common data structure based at least in part on the function call to the second function; and
send, by the reusable bridge module of the host bridge, the second common data structure to the fourth function of the native bridge interface, wherein the fourth function converts the second common data structure to a second native data structure implemented in the second programming language and calls the second native function within the native host using the second native data structure.

12. The system of claim 11,
wherein the first common data structure and the second common data structure are readable in both the application host and the native host.

13. The system of claim 12, wherein:
the function call to the first function includes one or more arguments associated with calling the first native function; and
the first common data structure is generated using the reusable bridge module to include the one or more arguments associated with calling the first native function.

14. The system of claim 13, wherein the native bridge interface sets, within the native host, the first native data structure to include the one or more arguments from the first common data structure.

15. The system of claim 14, wherein:
the application bridge interface implements the function call to the first function; and
the computer-executable instructions cause the system to receive, by the application bridge interface within the application host, the function call to the first function, from the user application.

16. The system of claim 11, wherein the computer-executable instructions cause the system to:
generate, by a first external interface of the reusable bridge module, the first common data structure;
provide, by the first external interface, the first common data structure to a conversion module of the reusable bridge module; and
parse, by a second external interface of the reusable host bridge, the first common data structure received from the conversion module to identify the native bridge interface, wherein the parsing includes obtaining key/value pairs to the native bridge interface;
send, by the reusable bridge module of the host bridge, the first common data structure to the third function of the native bridge interface based on a native data structure created by the native bridge interface using the key/value pairs, wherein the third function converts the first common data structure to the first native data structure and calls the first native function within the native host using the first native data structure, the first native data structure being implemented in the second programming language.

17. A method for event processing, the method comprising:
processing, by a host bridge, a schema that identifies a first event within a native host, and identifies a first event handler function within a first user application that is configured to handle the first event within an application host for a first programming language, the schema further identifying a second event within the native host, and further identifying a second event handler function within a second user application that is configured to handle the second event within the application host;
generating, by the host bridge and based on the schema, a first function of an application bridge interface that is implemented in a first programming language, executed within the application host, and communicates between the user application and a reusable bridge module of the host bridge;
generating, by the host bridge and based on the schema, a second function of the application bridge interface that is implemented in the first programming language, executed within the application host, and communicates between the second user application and the reusable bridge module of the host bridge;
generating, by the host bridge and based on the schema, a third function of a native bridge interface that is implemented in a second programming language, executed within the native host, communicates between the reusable bridge module and the native host, and includes a first event receiver function for the first event, wherein the first programming language is different from the second programming language;
generating, by the host bridge and based on the schema, a third function of the native bridge interface that is implemented in the second programming language, executed within the native host, communicates between the reusable bridge module and the native host, and includes a second event receiver function for the second event;
receiving, by the host bridge via the native bridge interface, a call to the first event receiver function from the native host;
generating, by the host bridge via the first event receiver function of the native bridge interface, a first common data structure that corresponds to the first event based at least in part on the call to the first event receiver function;
converting, by the host bridge via the application bridge interface, the first common data structure to a first application data structure implemented in the first programming language; and
calling, by the host bridge via the first function of the application bridge interface, the first event handler function within the application host using the first application data structure;
receiving, by the host bridge via the native bridge interface, a call to the second event receiver function from the native host;
generating, by the host bridge via the second event receiver function of the native bridge interface, a second common data structure that corresponds to the second event based at least in part on the call to the second event receiver function;
converting, by the host bridge via the application bridge interface, the second common data structure to a second application data structure implemented in the first programming language; and
calling, by the host bridge via the second function of the application bridge interface, the second event handler function within the application host using the second application data structure.

18. The method of claim 17, wherein:
the call to the first event receiver function includes one or more arguments for the first event;
generating the first common data structure comprises generating the first common data structure to include the one or more arguments for the first event; and
generating the first application data structure comprises generating the first application data structure to include the one or more arguments for the first event.

19. The method of claim 18, the method further comprising:
receiving, by the host bridge via the application bridge interface and from the first user application, a call to a first event registration function that is implemented in the first programming language within the application bridge interface, and corresponds to the first event receiver function within the native bridge interface; and
associating the first event with the first event receiver function within the native bridge interface.

20. The method of claim 19, wherein generating the application bridge interface comprises:
  generating a first event argument handler function that is implemented in the first programming language and within the application bridge interface, and configured to convert the first common data structure to the first application data structure; and
  associating the first event argument handler function with the first event.

* * * * *